US008454208B2

(12) United States Patent
Porter (10) Patent No.: US 8,454,208 B2
(45) Date of Patent: Jun. 4, 2013

(54) RETRACTABLE ENERGY CONSERVING SOLAR OR OTHER POWERED LANDSCAPE LIGHT INCLUDING METHOD OF REPLACING RETRACTABLE LANDSCAPE LIGHT

(75) Inventor: Robert M. Porter, Wellington, CO (US)

(73) Assignee: Catapult Engineering, LLC, Wellington, CO (US)

(*) Notice: Subject to any disclaimer, the term of this patent is extended or adjusted under 35 U.S.C. 154(b) by 0 days.

(21) Appl. No.: 13/464,479

(22) Filed: May 4, 2012

(65) Prior Publication Data
US 2012/0286688 A1 Nov. 15, 2012

Related U.S. Application Data (63) Continuation of application No. 13/106,120, filed on May 12, 2011, now Pat. No. 8,186,857.

(51) Int. Cl.
*B60Q 1/12* (2006.01)
(52) U.S. Cl.
USPC ......... 362/384; 362/153.1; 362/382; 362/285
(58) Field of Classification Search
USPC .................. 362/382, 384, 385, 38, 153.1
See application file for complete search history.

(56) References Cited

U.S. PATENT DOCUMENTS

| 4,974,134 | A | * | 11/1990 | Bourne ........................ 362/286 |
| 5,003,441 | A | | 3/1991 | Crowe et al. |
| 5,068,773 | A | | 11/1991 | Thoth |
| 5,072,345 | A | | 12/1991 | Goggia |
| 5,142,463 | A | * | 8/1992 | Panagotacos et al. ........ 362/285 |
| 5,144,542 | A | * | 9/1992 | Puglisi .......................... 362/386 |
| 5,329,437 | A | * | 7/1994 | Briggs .......................... 362/393 |
| 5,683,176 | A | | 11/1997 | Clendenin |
| 6,099,139 | A | * | 8/2000 | Lapensee .................... 362/153.1 |
| 7,004,043 | B2 | * | 2/2006 | Erel et al. .................... 74/89.23 |
| 7,261,443 | B1 | | 8/2007 | Hayes, Jr. |
| 7,476,006 | B2 | | 1/2009 | Hinds |
| 2011/0228545 | A1 | | 9/2011 | Porter |

OTHER PUBLICATIONS

Parent U.S. Appl. No. 13/106,120, filed May 12, 2011.

* cited by examiner

*Primary Examiner* — Ali Alavi
(74) *Attorney, Agent, or Firm* — Santangelo Law Office, P.C.

(57) ABSTRACT

The current inventive technology relates to methods and apparatus for a providing an energy efficient and durable landscape lamp. The lamp can retract when not in use to prevent damage. The high efficiency retractable landscape lamp of this invention may be powered by conventional distributed low voltage or by a solar photovoltaic (PV) source. In some embodiments the lamp may be powered by low voltage, it may be individually interchangeable with a conventional low voltage landscape lamp or may be installed in a low voltage lighting complete system. This lamp may house the electrical components and gearmotor in an upper dry compartment making it reliable in outdoor installations, even in wet environments. This invention can also relate to operation without the need for unreliable limit switches for the raising and lowering of the lamp.

21 Claims, 5 Drawing Sheets

RETRACTABLE ENERGY CONSERVING SOLAR OR OTHER POWERED LANDSCAPE LIGHT INCLUDING METHOD OF REPLACING RETRACTABLE LANDSCAPE LIGHT

CROSS-REFERENCES TO RELATED APPLICATIONS

This application is a continuation of U.S. Nonprovisional application Ser. No. 13/106,120, filed May 12, 2011 said application is hereby incorporated by reference herein in its entirety.

TECHNICAL FIELD

This invention relates to providing a landscape lamp which uses less energy and can last for years without the need for frequent replacement. The lamp can retract when not in use to prevent damage. Having the lamp retract also makes easy lawn care possible. A retractable landscape lamp of this invention may be powered by conventional distributed low voltage or by a solar photovoltaic (PV) source. If the lamp is powered by low voltage, it may be individually interchangeable with a conventional low voltage landscape lamp or may be installed in a low voltage lighting complete system. This lamp may house the electrical components and gearmotor in an upper dry compartment making it reliable in outdoor installations, even in wet environments. This invention can also relate to operation without the need for unreliable limit switches for the raising and lowering of the lamp. Efficient long life LED lamps are also provided for. This lamp also makes use of inexpensive materials which in combination with the robust design makes it ultimately practical for widespread use. The conservation of energy and replacement materials makes this landscape lamp ultimately green.

BACKGROUND OF INVENTION

Recent landscape lighting has taken the advantage of high efficiency long life LED bulbs. But the problems of low reliability and frequent replacements remain. Landscape lights are useful at night and are in the way during the day. Just like sprinklers, it is obvious that having them retract when not in use protects the lamp and keeps them safe. Additionally, mowing around landscape lights or weed whacking around them is troublesome. There have been many attempts to make practical retractable landscape lights (see U.S. Pat. Nos.: 5,068,773, 5,072,345, 5,683,176, 7,261,443, and 7,476,006) but none have delivered the objects of the invention herein disclosed.

This retractable landscape light is designed to be cost competitive with conventional low voltage landscape lighting or solar lighting but offers the feature of being retractable. The idea of being retractable is not new. There are many patents issued on retractable landscape lighting. But to date, no-one has invented a retractable lamp which contains all the benefits which are disclosed in this patent application. U.S. Pat. No. 7,261,443 describes a retractable light powered by pneumatics. Other inventions have an actuator mechanism located in the lower part of the lamp where water may gather. The ideas disclosed in prior art have not adequately enabled a widely useable landscape light which retracts when not being used.

SUMMARY OF INVENTION

There are several related but independent objects of this invention. The first object is to make a landscape light that conserves energy. Another is to provide a light which retracts when not in use. Another object is to make a low voltage landscape light which may be individually interchangeable with conventional low voltage lighting fixtures. That is, to make a light which is simply powered and connected in the same way as a conventional landscape light. Such a lamp may operate without causing any instability or overload to the existing installation. This can allow a person to replace just the low voltage landscape lights in a lawn (allowing easy mowing) without having to replace a whole landscape lighting system. Another object is to make a retractable solar powered lamp. Another object of the invention is to use inexpensive materials as a part of making this invention practical. Another object of the invention is to provide a lamp fixture which lasts for a reasonable number of years. One goal realized it is more reliable to provide a way to have the electronics and drive motor located in a dry compartment, preferably in the top portion of the fixture. Another object of the invention is to consume low power during start-up and normal operation. One goal notes it is helpful to find a way to use LED lights and to provide a way for the motor operation to commence without drawing start-up current which would affect the turn-on of a low voltage system. Another object of the invention necessary for low voltage power is a method of providing electrical power to the lamp portion which, of course, moves. Also it is an object to provide this connectivity while satisfying the need for code compliance. The lamp of invention can be efficient and lasts for years compared to months for conventional lamps. This makes the lamp of invention green in that it provides needed nighttime lighting with very high efficiency while eliminating the need for frequently replacing lamps damaged from daytime activities.

DESCRIPTION OF PREFERRED EMBODIMENTS

As mentioned with respect to the field of invention, the invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

One of the surprising aspects of this embodiment is that it can be accomplished with common and inexpensive materials. For example the extraordinary diffuser lens may be made from acrylic plastic (also may be known as Plexiglas). The tubing for the support and drive mechanisms [1, 2, 3] may be made from PVC. The lead screw (or drive screw) [4] may be a simple nylon threaded rod. Having invented this unexpected combination of common materials is one of the aspects of making a retractable landscape light practical for home use.

The upper section [5] can be a dry compartment housing all the vulnerable components. This can include the gearmotor [6], the LEDs [7], a battery [8], and control electronics [9]. This compartment may be sealed with a vent if necessary. Or it may rely on being airtight and perhaps even utilizing air pressure to prevent water from filling up the lower support section to the level of the upper portion. The LEDs [7] may form a circle to provide uniform illumination.

As shown for this embodiment the gearmotor [6] shaft is coupled to the drive screw [4]. The drive screw can also be threaded into the drive nut [10] which can be fixed to the inner concentric support member [3]. As the gearmotor turns the drive screw the upper section is raised or lowered depending on the direction the gearmotor is energized. In this embodiment a section of wire (not shown) may pass along the inside of the middle support member [2] and is attached to this member at the top and bottom. This wire can slide through a slot (not shown) in the center support member [3]. This wire passing through the slot can prevent the upper section from spinning when the gearmotor is powered.

This is a description of one preferred embodiment. There are many embodiments which will be understood by one skilled in the art with the attributes described here. Many variants are included by understanding that the examples are intended to be illustrative but not limiting. For example, a tube may be understood to be round or square or it may be constructed of open structural members accomplishing the same function. The lamp could be incandescent. The battery may be a large capacitor, or it may be rechargeable or not.

Figure 4:
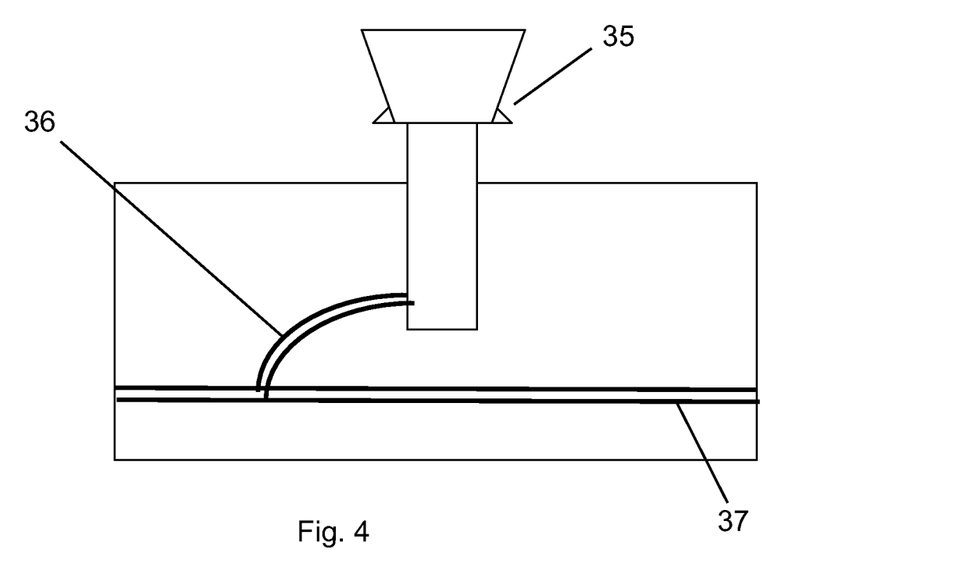
FIG. 4—shows a conventional low voltage landscape lamp with exemplary wires connected to a distribution cable.
Figure 5:
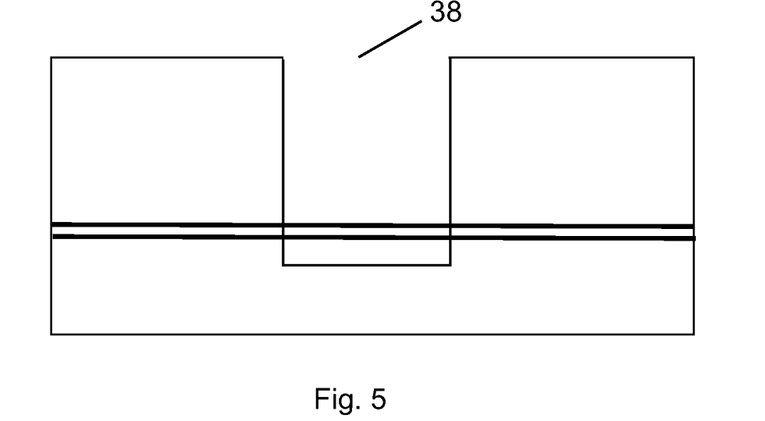
FIG. 5—show the removal of a conventional low voltage landscape lamp with exemplary wires connected to a distribution cable from the ground and enlargement of the remaining hole in one embodiment thereof.
Figure 6:
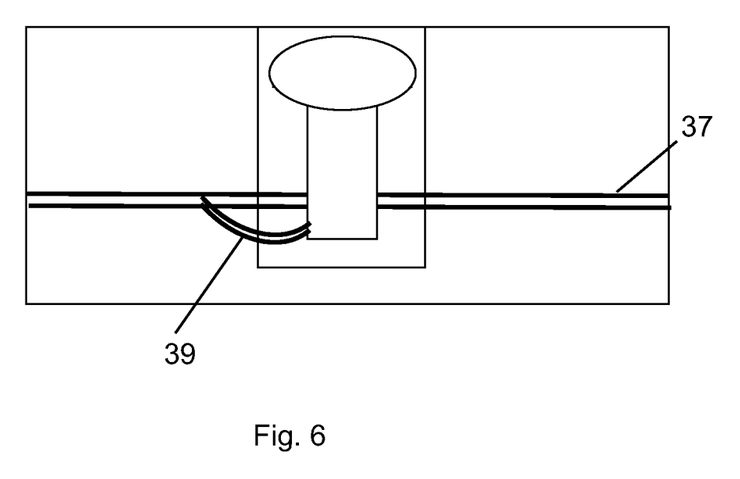
FIG. 6—shows the insertion of a retractable lamp and connection of exemplary wires to a distribution cable into the enlarged hole one embodiment thereof.

In embodiments a tightly associated relationship between the mechanical and electrical aspects of this invention taken together may enable remarkable results. As shown generally in FIGS. 4-6, in certain embodiments of the invention one may replace a single conventional low voltage landscape lamp (35) with a retractable lamp described herein. As shown in FIGS. 4-5, a user may simply dig up the conventional lamp (35) and remove the wires (36) from the distribution cable (37). Next it may be necessary to dig a larger hole (38). As generally shown in FIG. 6, a user may install the retractable lamp perhaps by inserting the retractable lamp in the hole (38), connect the retractable lamp wires (39) to the same distribution cable (37) and fill in the hole. Installing the lamp vertically and firmly provides the opportunity to enjoy this retractable lamp for many years as it is protected from the damaging daytime activities.

One valuable aspect of this invention is that the gearmotor may be located in the top portion. With the arrangement of this embodiment the gearmotor may be housed in a dry compartment differentiating this invention from prior art. This can be an important element to achieve interchangeability with conventional lamps as past art may embody the liability of having degradable parts of the drive mechanism located in portions of the lamp which may be covered by water. For a low voltage landscape lamp to be interchangeable on an existing installation it may satisfy any one or combination of the following criteria. First the power consumption might be equal to or less than the lamp being replaced. Second the power consumption might not have any surges which would cause instability. Third, it might utilize connections that are consistent with existing one with little or even no changes. Fourth, it might be mechanically similar in any number of respects perhaps such as length, depth, width, diameter, or other regards.

Dedicated space in the top portion for the gearmotor may also prevent the lower tubes from having to be longer (for housing the drive mechanics or motor)—necessitating a deeper hole for installation. To support the drive mechanism in the upper section can also require a three piece support system in the lower support section as compared to a two piece construction of prior art retractable lamps. To be accurate it is possible to use a two piece support but this may require the lamp support post to be slotted (not shown) which is not as attractive. But the slotted post concept is included as an option. Another option may include using two vertical lamp posts and housing the motor at the top of the outer support structure.

Again referring to FIG. 1, it may be seen that the support system for some embodiments may include three concentric tubes or support members and a threaded rod. This support section is intended for being buried in the ground [20] and may contain materials which will not degrade over time when subjected to water and natural outdoor environmental conditions. The outer tube [1] may simply be a protective housing. Attached to the top of this tube can be a section with a large enough diameter to protect the lamp portion when the lamp is retracted [21]. In this way robustness is achieved for being run over by a riding lawn mower or perhaps even a car. This is adequate protection for commonly occurring activities in a lawn. The protective housing may extend enough above the lamp portion to provide this safety. In particular, a tire running over this lamp will have a radius. The top of the lamp portion may be lower than the protective piece minus the effect of the tire radius as can be understood.

Figure 1:
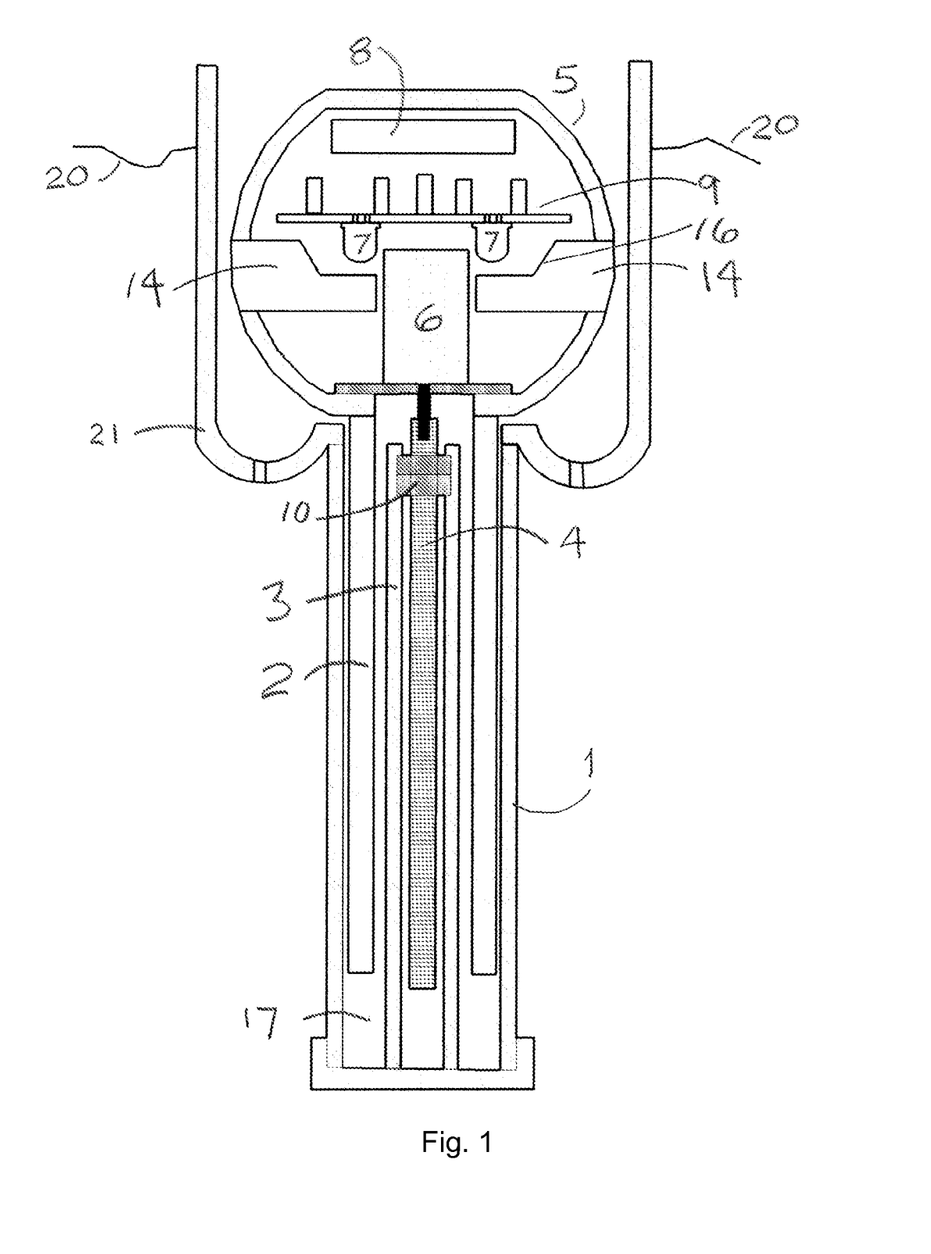
FIG. 1 shows an embodiment of a retractable landscape lamp in the retracted position.
Figure 2:
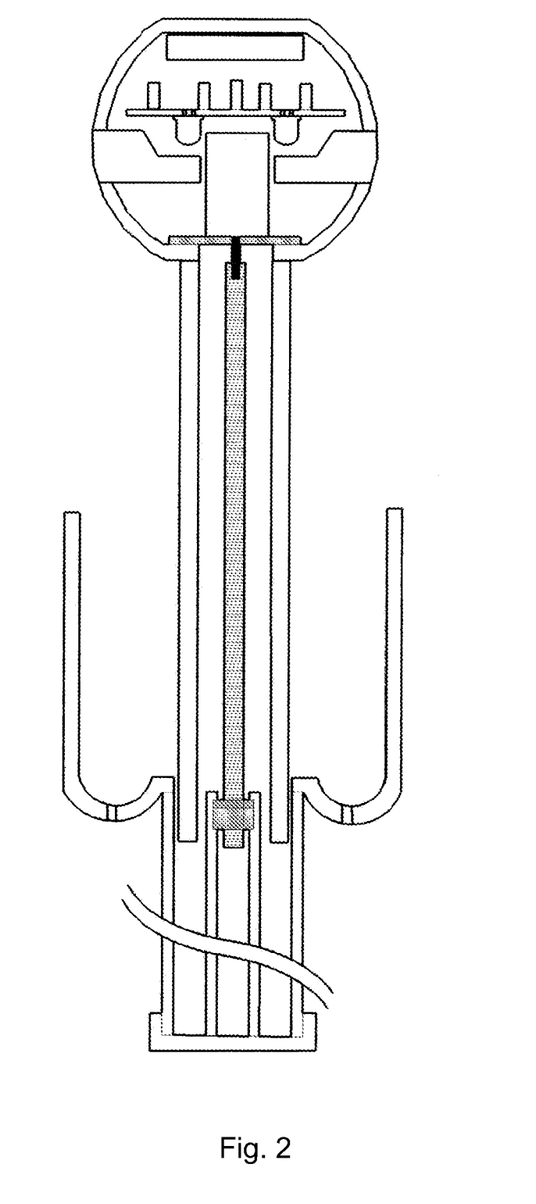
FIG. 2 shows the same embodiment with the lamp in the extended position for clarity.

The next tube inward [2] in this embodiment can be the moving lamp post. This post may perform several functions. First, it supports the lamp portion. It also may perform the function of having the electrical conductors along it's inside surface. This wire may be held taught and slide in a groove in the inner support post. There may also be a nut or post protruding from the inward surface of the lamp post which slides in the inner post as a guide to prevent spinning of the lamp. The many means for preventing the lamp from spinning are considered as incorporated. This moving lamp post may be shorter than the other two posts. In its retracted position a shorter post allows room for coiled wire in an open cylindrical space [17] between the outer post and the inner post.

The inner post [3] may be attached to a bottom piece and may provide a few needed functions. This can be a support post for the moving lamp post. Near or at the top of this post may be a captive (metal or plastic) nut. This may be a cage-nut or other means to allow for misalignment or curvature of the lead screw. Inside the inmost post may be a threaded nylon (or any material will work) rod being used as a lead screw or drive screw. This threaded rod may be coaxial with the inner post and may pass through the captive nut. When the threaded rod is rotated in one direction it may force the lamp post to rise. The drive gearmotor (discussed later) can be bidirectional. When it rotates the other direction the lamp retracts into its protective outer support member. The inner post may have a groove in it to work in coordination with the lamp post to house the electrical conductors and perform the function of preventing the lamp from spinning. A guide pin may also be used to prevent spinning.

Felt or other stabilizing pieces may be used to provide damping or other mitigation of undesirable shaking or uncontrolled motion as the lamp is raised or lowered. It may be seen that this damping could take many forms. Examples of some places for the use of stabilizer rings include: around the inside of the top of the outer tube, [1], around the inside of the bottom of the middle tube [2], and around the outside of the top on the inner tube [3].

Attention to the coupling of the gearmotor to the threaded rod can be important. In mechanical systems there are often misalignments which may need to be managed. In one simple embodiment the threaded drive rod may have an axial hole centered in the top for the gearmotor shaft. The gearmotor in this embodiment had a 3 mm D shaft. To aid in securing the rod to the shaft a nut was screwed onto the top of the threaded rod (in this disclosure the terms lead screw and threaded rod may be used interchangeably) and a two set screws inserted. The first set screw to engage the flat on the motor shaft. A second set screw may be used to oppose the force of the first and provide desirable balance.

Another simple preferred embodiment for coupling the drive shaft to the lead screw can provide tolerance for angular misalignment. This embodiment may utilize an axial hole in one end of the threaded rod which may be sized slightly larger than the drive shaft. The drive shaft from the motor may not have a flat in this embodiment. For this coupler, both the drive shaft and the lead screw have radial holes through them. A coupling pin may be inserted through the threaded rod and the hole in the motor shaft. The radial hole in the drive shaft may be sized slightly larger than the coupling pin. This coupling method can be tolerant of misalignment between the angles of the drive shaft and the lead screw preventing much of the potential radial thrust from being transferred to the drive shaft. The axial hole in the threaded rod may be sized for the maximum angular misalignment expected. This action is similar in nature to what is called a universal joint. Small washers or spacers may surround the coupling pin between the outside of the drive shaft and the inside of the lead screw.

This gearmotor when running may rotate the nylon drive screw and may cause the lamp head, motor and all, to rise (the motor as though by lifting itself up by its bootstraps!). During this motion the gearmotor generates axial thrust and depending on the gearmotor, may or may not require a thrust bearing. The gearmotors utilized in various embodiments can include 12 and 16 mm diameter gearmotors among others. A typical gearmotor may operate on 6 volts and have a 20:1 to a 100:1 gear ratio and have an output rpm in the range of 500. The stall torque may be in the range of 1 kg-cm with a stall current of in the range 1 amp. Obviously a wide range of gearmotors may be used. The electronics including the motor drive will be covered later. But there is a feature of using the full motor torque at the initialization of travel and reducing the current available prior to the end of travel. This can make it possible to avoid expensive limit switches physically located to detect end of travel. There may be a mechanical stop to the end of travel. There are many possible locations for this mechanical stop. The upper stop could simply be a cap nut screwed onto the bottom of the drive screw. The lower stop could be the top section bottoming out into its rest position. The drive mechanism simply pushes against this stop until a predetermined time expires. When resuming in the opposite direction, the full torque may be used. This allows the mechanism to always start and break free from any stresses of stopping or environmental barriers like soiling or icing. Having a mechanism without limit switches makes this embodiment much simpler, less expensive and more reliable over time as things wear or shift.

The luminous part of this invention may provide a beautiful uniform white light around the exterior surface of the diffuser lens [14]. The light source may consist of LED lamps [7], an electrical drive circuit and a diffuser lens. The LEDs in one embodiment may be 8 mm white straw-hat LEDs. An arrangement of 6 LEDs may be used to begin the process of making this a uniform radiator. The straw-hat configuration of LEDs can also aid the diffusion process by providing a wide radiation angle. The shape of the diffuser lens may be chosen to fill several simultaneous functions. First is the location in the lamp head as a support member. A curved or angled surface [16] may be machined (or otherwise manufactured) into the center portion. This curved surface may be uniformly roughened or frosted. The outer surface may also be uniformly roughened. These two roughened surfaces can serve to diffuse the light. Light from the LEDs may also be sent in random directions when entering the diffuser lens. Light may also be sent in scattered directions when exiting the lens. In addition another property of an acrylic (or other high index of refraction material) lens is that the index of refraction may be high enough to prevent much light from escaping the remaining (upper and lower) smooth surfaces.

Another important aspect of some embodiments can be the method for delivering the electrical power from the entry in the lower portion to the moving upper lamp portion. The outer tube and inner tube may extend beyond the lamp post tube by a distance in the range of an inch, more or less. In this space [17], the power wires (not shown) may be loosely coiled around the inner tube. The wires may continue along an inside surface of the lamp post as described earlier. When the lamp post is raised, the loosely coiled wire may gently slide through the space between the inner and outer tubes, slowly reducing the diameter of the coil as the length is increased. Adequate "slack" may be included for the desired range of motion desired.

Figure 3:
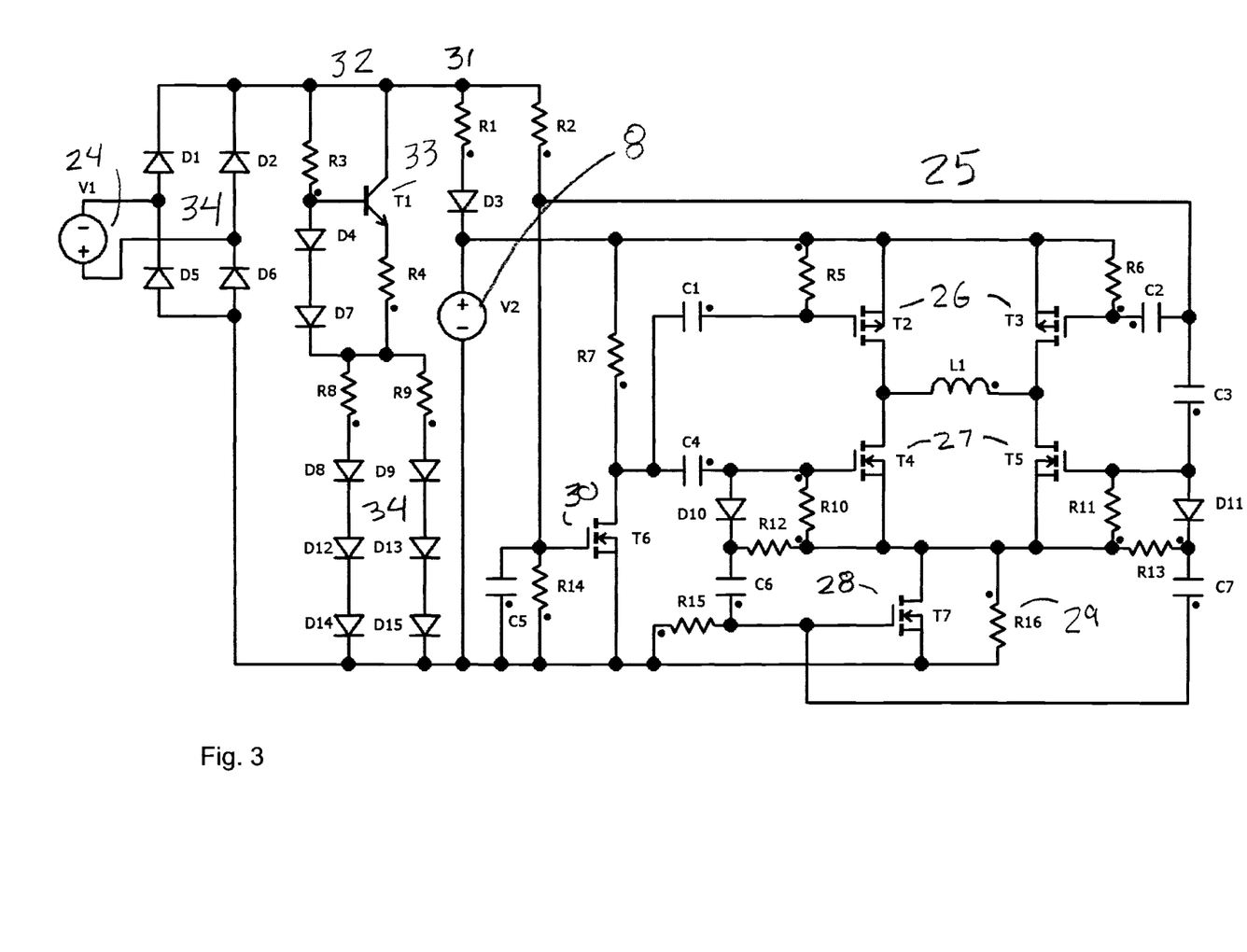
FIG. 3 is a schematic diagram of the electrical control circuitry in an embodiment. There are three functions, one for driving the LEDs, one for charging a battery and one for driving the gearmotor. These will be discussed in the detailed disclosure in the electrical section.

FIG. 3 is a schematic diagram for the electrical operation disclosed. The electronics of this embodiment may also include only inexpensive components. The embodiment shown in the FIG. 3 schematic does not make use of any integrated circuits. There are a few tradeoffs which have been made in this embodiment which are not restrictive to the scope of the invention. It is possible for example to make a drive mechanism which does not require stored energy. It could be spring operated for the release of the lamp when power is removed. For this embodiment however stored energy may be by means of a rechargeable battery [8]. Having a battery though enables one unexpected feature of this invention. While power is actually available, the gearmotor may be controlled to always operate from the battery for both the raising and lowering of the lamp. This may prevent a surge of power at turn-on. For large landscape systems a large surge at turn-on could cause instability. The battery may also provide a regulated voltage source which may be convenient for the motor control. It is easy to keep this battery charged as it is only used less than a minute a day but has hours/day to charge. Trickle charging the battery uses such a small amount of current it may be safely ignored when calculating the overall power required for the lamp. The battery used in this particular embodiment may be a 5 cell ⅓AAA or ⅔AAA NiMH battery pack. If long periods of non-use or shelf life are expected, a low self-discharge battery may be used. Charging of the battery for a low voltage landscape lamp occurs at night utilizing a small trickle charge from the distributed power. For a solar light the charging of this battery may be from a photovoltaic source during the daytime.

One method of stabilizing a low voltage landscape lighting system having retractable lamps may be to provide energy storage to operate the drive mechanism. This may leave only the luminary itself to be powered plus a small trickle charging current for the energy storage. The larger current required to operate the motor might cause overload or instability of the system if the drive mechanism is drawing power from the input connection during turn-on. A delay of the drive system at turn-on may also accomplish this stability but some randomization of the start times may be necessary to prevent all the drive mechanisms from drawing current at once.

The input power is shown as V1 [24]. This could be a 12 VAC low voltage source or may be a solar PV input. The discussion centers on a low voltage input but simple scaling changes may be made for a solar PV input as one skilled in the art will understand.

There may be three key functions of the electronic circuitry: the lamp driver, battery charger and the motor control. Referring to the schematic in FIG. 3, the motor control [25] may consist of an H-Switch for bidirectional control of the motor direction. This H-Switch could be an integrated circuit but for cost reasons four FETs (T2, 3, 4, 5) could be used as in this embodiment. Two P-channel FETs [26] and two N-channel FETs [27] may be used. There may also be a FET [28] in series with the lower H-Switch FETs. This series switch [28] may be controlled to provide a short period of low impedance at the initialization of the up or down motion. That is, there may be no current limit at the initialization of movement in either direction. After this period the FET may be turned off and a current limiting resistor (perhaps in the range of 7 ohms) [29] may be left in the circuit. This resistance may be considered part of a current limiter circuit as it causes the applied gate voltage to the lower H-switch FETs to be reduced. The FETs in the H-switch may be powered for a longer period than the time required to move the lamp up or down. After the lamp reached full up or down position the gearmotor may be in a stall condition with a current limit in place. Simple RC timing circuitry on each of the FET gate limits the drive time to slightly longer than that required for travel. This can make it possible to do away with locational limit switches. As mentioned earlier, when motion resumes in the opposite direction, full gearmotor torque may be utilized due to the function of the series FET [28]. Motor direction may be controlled by a FET such as T6 [30]. No mechanical switches may be required for this embodiment. In addition, no locational limit switches may be required. This can provide for robust, long lifetime operation.

The battery charger [31] may be a simple trickle charger consisting of R1, D3 and the battery V2 [8]. This circuit may provide pulsing current and may not utilize energy storage elements in the charger circuitry.

Another function for the electrical control circuitry may be to power the luminary [32]. The preferred luminary comprises LED lamps but any lamp will work as one skilled in the art knows. In the preferred embodiment for a low voltage connection, the LEDs are driven using extremely simple circuitry [32]. Instead of using an integrated driver circuit, a single transistor [33] may be used to regulate the current through strings of LEDs [34]. In the preferred embodiment two strings of three series LEDs may be used. Each string of three LEDs may have a current balancing series resistance. The two strings with resistors may be connected in parallel. A bipolar transistor [33] may be used to regulate the total current through these paralleled strings. Using the LEDs in series may build voltage and may make it efficient to use the conventional 12 VAC low voltage source without needing a special driver. The transistor [33] can be rated for high voltage to allow reliable operation during an input voltage surge. A simple diode bridge [34] may convert the 12 VAC to pulsing DC for the LED drive. The pulsating DC may also be used for trickle charging the battery. There may be no large electrolytic capacitor necessary to store energy. All the LED circuitry may operate from a surge two times per AC cycle. As an alternative, an energy storage device such as an electrolytic capacitor may be used to smooth the lamp power and the light output. A connection point could be across the input bride output or across the combination LED and current balancing resistors.

One feature of some embodiments may be that this lamp may provide similar light output as a 10 watt or higher incandescent source while never consuming more than 2 or 3 watts. Further, the system may provide capability, including retractability, normally might require a higher electrical load at much lower loads, akin to providing a 10 watt system with only a 2-3 watt level of load times the number of lights included. This is partly due to the high efficiency of the LED lamps and the simple LED lamp driver circuitry. But it is also due to the isolation of the motor drive from the input power when the motor is in use. The motor may be primarily powered from the battery. The battery may be trickle charged at a very low current spread over the entire time the lamp is powered. At the same time this lamp may draw such low power consumption it may also provide the feature of being retractable. The ability to retract during the day eliminates one reason landscape lamps are replaced—that being damage cause by abuse. The LED lamps also eliminate a second fundamental reason for lamp replacement—that being replacing an incandescent bulb. The combination of efficient light generation and isolation of the motor drive surges may make the peak power to lie in the range of less than 2 watts or less than 3 watts. The combination of the features herein disclosed can make this lamp truly green. It can take little power to operate and it can eliminates most of the reasons which exist today for frequent replacement of landscape lamps. The fact the materials utilized in this landscape lamp are common inexpensive materials is simply additional goodness for this invention.

As can be easily understood from the foregoing, the basic concepts of the present invention may be embodied in a variety of ways. It involves both energy conserving solar or other power landscape light techniques as well as devices. In this application, the energy conserving solar or other power landscape light techniques are disclosed as part of the results shown to be achieved by the various elements and devices described and as steps which are inherent to utilization. They are simply the natural result of utilizing the devices and elements as intended and described. In addition, while some elements are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the devices and elements described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such changes and alternative terms are to be understood to be explicitly included in the description.

Any patents, publications, or other references mentioned in this application for patent or its list of references are hereby incorporated by reference. Any priority case(s) claimed at any time by this or any subsequent application are hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference.

Finally, all references listed in this application, perhaps in the Information Disclosure Statement or the Specification other information statement filed with or included in the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the energy conserving solar or other power landscape light devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition and as to computerized aspects and each aspect amenable to programming or other programmable electronic automation, the applicant(s) should be understood to have support to claim and make a statement of invention to at least: xiv) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. Both the examiner and any person otherwise interested in existing or later potential coverage, or considering if there has at any time been any possibility of an indication of disclaimer or surrender of potential coverage, should be aware that in the absence of explicit statements, no such surrender or disclaimer is intended or should be considered as existing in this or any subsequent application. Limitations such as arose in *Hakim v. Cannon Avent Group, PLC*, 479 F.3d 1313 (Fed. Cir 2007), or the like are expressly not intended in this or any subsequent related matter.

In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A retractable landscape lamp comprising:
    a lower support portion having a plurality of concentric support members wherein said lower support portion has at least three concentric support members and further comprising a middle concentric support member configured to be shorter than the other concentric support members, making space for coiled power wire;
    a screw drive mechanism;
    wherein said lower support portion is at least partially located below ground level;
    wherein said lower support portion is made from plastic materials, wire and/or a drive nut; and
    wherein said retractable landscape lamp is configured to be individually interchangeable with a conventional low voltage landscape lamp.

2. A retractable landscape lamp as described in claim 1, wherein said screw drive mechanism is powered by a solar power source.

3. A retractable landscape lamp as described in claim 1, wherein said screw drive mechanism is powered by a distributed low voltage source.

4. A retractable landscape lamp having an upper lamp head section wherein said upper lamp section comprises:
    a drive motor that raises and lowers said lamp head section;
    a luminary;
    electrical control circuitry that powers said luminary and said drive motor; and
    wherein said upper lamp head section is configured to be protective of said motor and control circuitry.

5. A retractable landscape lamp as described in claim 4, wherein said electrical control circuitry comprises a current limit for said drive motor when in the normal drive condition and no current limit at initial movement.

6. A retractable landscape lamp as described in claim 4, wherein said luminary comprises a lens made from a material having a high index of refraction.

7. A retractable landscape lamp which is capable of being interchangeable with a low voltage distributed lamp, using the steps of:
    removing the existing low voltage landscape lamp and the connection wires from the distribution cable;
    enlarging the hole as necessary;
    placing a retractable lamp configured to be interchangeable with a conventional low voltage landscape lamp in the hole;
    connecting said retractable landscape lamp wires to said distribution cable;
    filling in the hole around the retractable lamp as necessary; and
    powering said retractable landscape lamp from the distribution cable such that said retractable lamp extends and/or illuminates when power is applied and retracts and/or extinguishes when power is removed.

8. A retractable landscape lamp as described in claim 7 and further comprising a drive motor mechanism located in a protected upper section of said retractable lamp.

9. A method of stabilizing a system of low voltage retractable landscape lamp comprising the step of:
    establishing a drive motor that raises and lowers a lamp head section having at least one luminary;
    establishing electrical control circuitry that powers said luminary and said drive motor wherein said lamp head section is configured to be protective of said drive motor and control circuitry; and
    using stored energy in each lamp to operate the drive mechanism.

10. A method of stabilizing a system of low voltage retractable landscape lamp as described in claim 9 wherein said step of using stored energy in each lamp to operate the drive mechanism comprises the step of using a rechargeable battery in each lamp to operate the drive mechanism.

11. A method of stabilizing a system of low voltage retractable landscape lamp as described in claim 10 and further comprising the step of utilizing LED lamps to minimize power consumption.

12. A method of stabilizing a system of low voltage retractable landscape lamp as described in claim 11 wherein said step of utilizing LED lamps to minimize power consumption comprises the step of powering said LED lamps using a current limiter circuit.

13. A method of stabilizing a system of low voltage retractable landscape lamp as described in claim 10 wherein said step of using a rechargeable battery in each lamp to operate the drive mechanism comprises the step of trickle charging during the time the lamp is powered from the low voltage distributed power.

14. A method of powering a retractable landscape lamp comprising the step of:
   establishing a drive motor that raises and lowers a lamp head section having at least one luminary;
   establishing electrical control circuitry that powers said luminary and said drive motor wherein said lamp head section is configured to be protective of said drive motor and control circuitry; and
   utilizing current limiting circuitry to limit torque prior to an end of travel.

15. A method of powering a retractable landscape lamp as described in claim 14 and further comprising the step of utilizing a time limit element to limit the time the motor is operated after lamp travel has stopped.

16. A method of powering a retractable landscape lamp as described in claim 15 wherein said step of utilizing a time limit element comprises deriving a time limit from RC circuitry.

17. A method of powering a retractable landscape lamp as described in claim 15 wherein the combination of a current limit and a time limit are used to limit power dissipation in the drive mechanism after end of travel has been reached rather than relying on any form of locational limit switches.

18. A method of powering a retractable landscape lamp as described in claim 14 and further comprising the step of utilizing drive circuitry allowing full motor torque at the onset of motion and reduced torque prior to an end of travel.

19. A method of powering a retractable landscape lamp as described in claim 15 wherein said step of utilizing drive circuitry comprises the step of providing a current limiter bypass circuit to achieve said full motor torque.

20. A method of powering a retractable landscape lamp comprising the steps of:
   determining the direction of lamp motion thorough operation of said electrical motor drive control circuitry; and
   limiting the current available to the drive motor prior to end of travel thorough operation of said electrical motor drive control circuitry; and
   limiting the duration the drive motor may spend in a stalled condition thorough operation of said electrical motor drive control circuitry; and
   using only electrical component types selected from a group consisting of:
      transistors
      resistors
      capacitors
      diodes and
      interconnection wires and/or paths between elements.

21. A method of powering a retractable landscape lamp as described in claim 20 wherein said electrical motor drive control circuitry is provided on a single printed circuit board.

* * * * *